July 10, 1951  W. M. ZWOSTA  2,560,060
PICKLE PUMPING MACHINE
Filed Sept. 30, 1949  3 Sheets-Sheet 1

Inventor,
William M. Zwosta
By John N. Randolph
Attorney

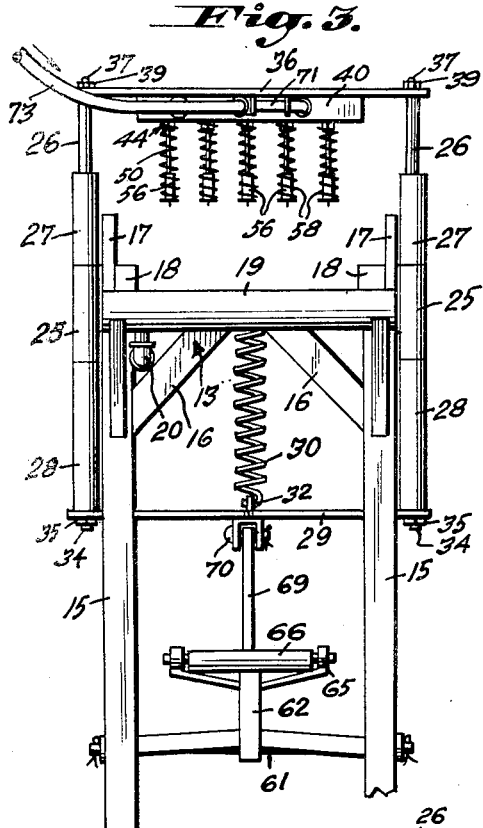
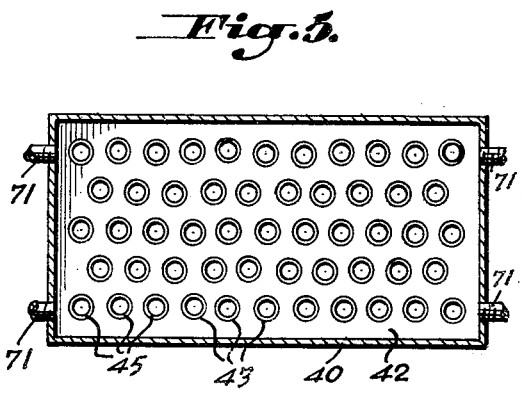
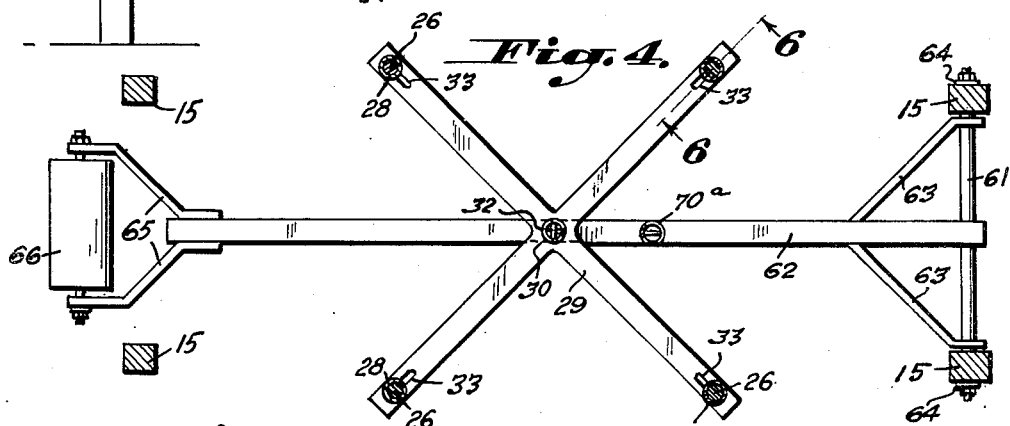
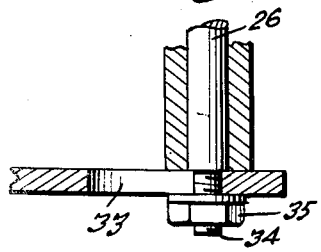

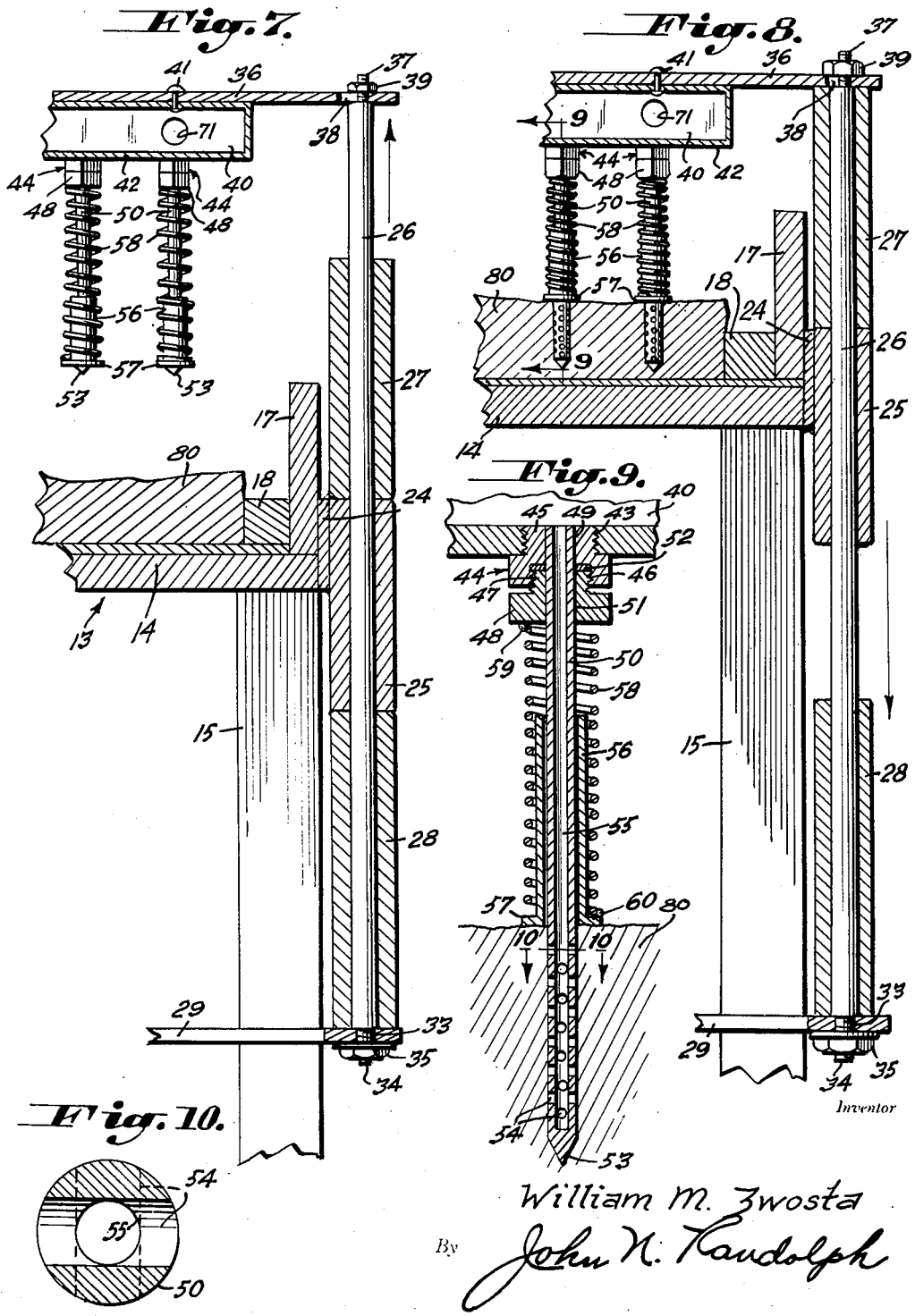

Patented July 10, 1951

2,560,060

UNITED STATES PATENT OFFICE 2,560,060

PICKLE PUMPING MACHINE

William M. Zwosta, Columbus, Ohio

Application September 30, 1949, Serial No. 118,833

9 Claims. (Cl. 99—256)

This invention relates to a novel machine for use in injecting a pickle or curing solution into meat and is particularly intended and adapted for use for injecting the pickle or curing solution into bacon and whereby the injection can be quickly and efficiently accomplished so that the bacon may be promptly placed in a smoke house after it has been injected with the pickle solution without the necessity of submerging the meat for a period of time in a pickle solution.

Another object of the invention is to provide a pickle pumping machine primarily intended for use in pumping bacon with a pickle solution and wherein the bacon can be quickly and accurately pumped with the solution through a plurality of injection needles which are arranged to equally distribute the pickle or curing solution through the bacon so that the proper amount of the pickle solution may be accurately injected and uniformly distributed.

Still a further object of the invention is to provide a machine of the aforedescribed character of extremely simple construction which is capable of being economically manufactured and sold, which will be efficient and durable for accomplishing its intended purpose and which may be readily operated for accurately pumping meat, preferably bacon with a pickle or curing solution.

Various other objects and advantages of the invention will hereinafter become more fully apparent from the following description of the drawings, illustrating a preferred embodiment of the invention, and wherein:

Figure 3 is an end elevational view thereof looking from left to right of Figure 1;

Figure 4 is a horizontal sectional view taken substantially along a plane as indicated by the line 4—4 of Figure 1;

Figure 5 is a horizontal sectional view taken substantially along a plane as indicated by the line 5—5 of Figure 1;

Figure 6 is an enlarged fragmentary sectional view taken substantially along a plane as indicated by the line 6—6 of Figure 4;

Figure 7 is a fragmentary vertical sectional view on an enlarged scale taken substantially along a plane as indicated by the line 7—7 of Figure 1;

Figure 8 is a fragmentary cross sectional view on an enlarged scale showing a portion of the machine in a projected position and with the injection needles penetrating a piece of bacon supported by the machine for receiving the pickle or curing solution;

Figure 9 is an enlarged sectional view taken substantially along a plane as indicated by the line 9—9 of Figure 8, and Figure 10 is an enlarged cross sectional view taken substantially along a plane as indicated by the line 10—10 of Figure 9.

Figure 1:
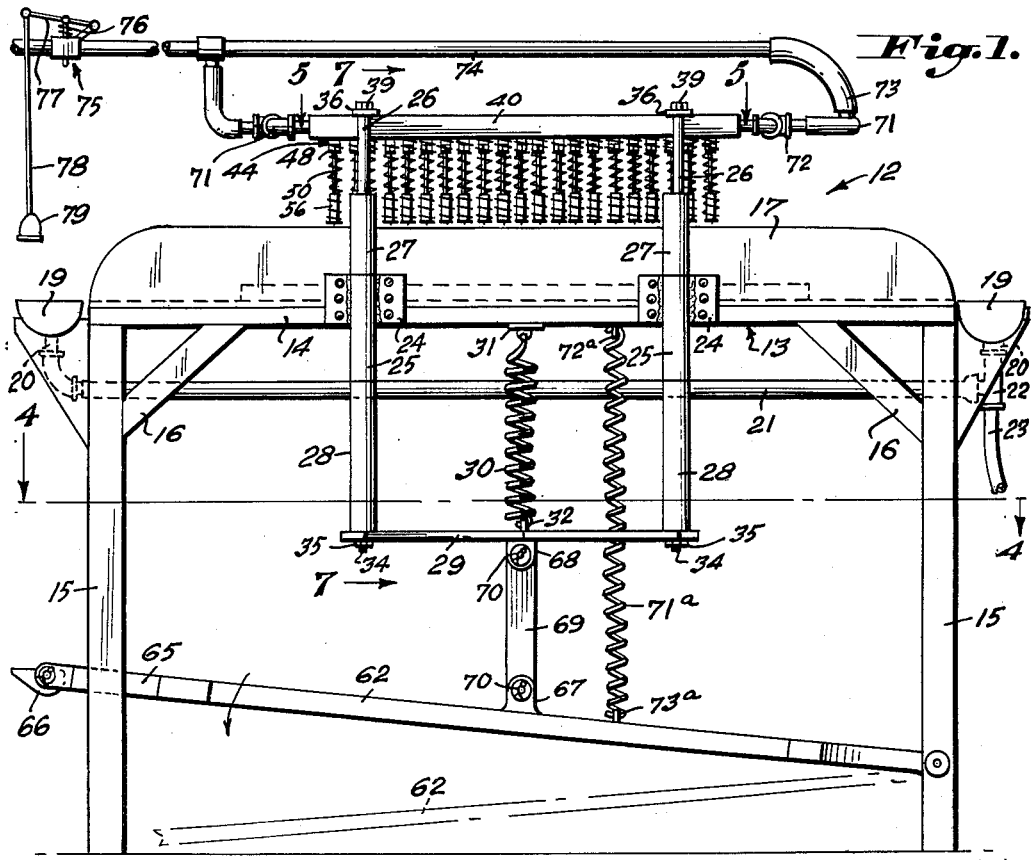
Figure 1 is a side elevational view showing the machine in its normal position with the injection needles in an elevated or retracted position.
Figure 2:
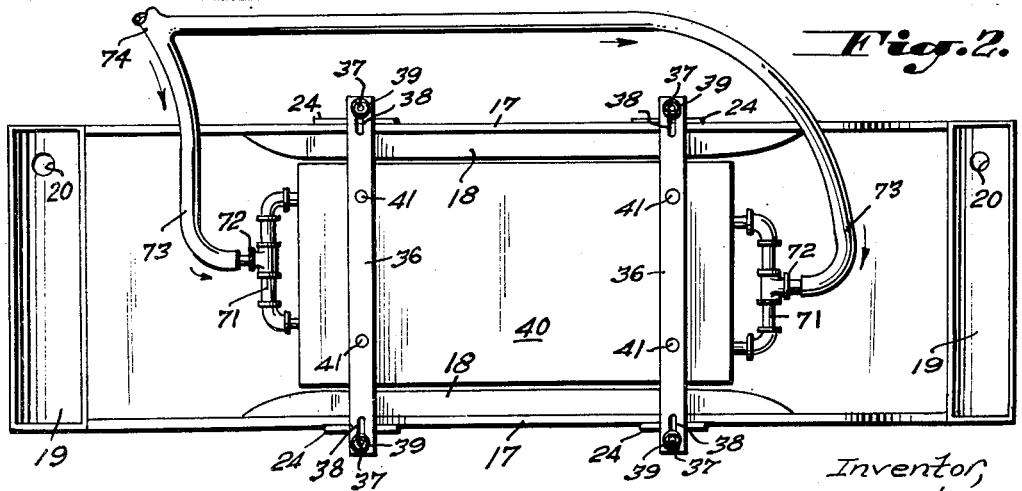
Figure 2 is a top plan view of the machine.

Referring more specifically to the drawings, the novel pickle pumping or pickle injection machine comprising the invention is designated generally 12 in its entirety and includes a supporting table, designated generally 13 including a table top 14 and depending corner supporting legs 15 which are suitably braced as seen at 16 relatively to the table top 14. The table 13 is of elongated shape and is provided adjacent its side edges with upstanding side walls 17 which rise from the upper surface of the table top 14 and which extend longitudinally thereof and which are provided adjacent their lower edges and on their inner sides with enlargements or wall portions 18, as best seen in Figure 3. The table top 14 may be of two-ply construction, as illustrated in Figures 7 and 8, including an upper ply of stainless steel or other similar material which may be readily maintained in a clean and sanitary condition. A trough 19 is secured to and extends across each end of the table top 14 and provides a drain trough, for a purpose which will hereinafter be described. Each drain trough 19 is provided with an outlet 20 which is connected by tubing and pipe couplings as seen at 21 and 22, respectively, to a common drain pipe 23 leading to a suitable sump or well, not shown.

Two longitudinally spaced brackets 24 are secured to each side edge of the table top 14 and the contiguous wall 17. Each of said brackets 24 supports a vertically disposed sleeve member 25 which forms a guide for a rod 26 which is reciprocally mounted therein, as best seen in Figures 7 and 8. Each rod 26 also carries an upper sleeve 27 and a lower sleeve 28, which last mentioned sleeves are reciprocally supported on the rods 26. A cross-shaped member or spider 29 is supported beneath the table top 14 by a relatively heavy contractile coiled spring 30, the upper end of which is attached to the table top 14 by a hanger bracket 31 and the lower end of which is connected to the center of the spider 29 by an upstanding eye 32. The four legs of the spider 29, which extend diagonally to the longitudinal axis of the table 13 are each provided adjacent its extremity with a longitudinal slot 33, as best seen in Figures 4 and 6 through which a restricted threaded extension 34 of one of the rods 26 loosely extends so that the lower end of the enlarged portion of the rod 26 rests on the spider 29. A nut 35 engages each threaded extension 34, beneath the spider 29 and is adapted to be tightened for clamping the rod 26 thereto. It will be apparent that the lower end of each rod 26 is connected to an arm of the spider 29 and that said rods 26 are thereby yieldably supported on the table 13 by the spring 30. Two bars 36 extend transversely of the table 13 and are disposed thereabove and supported at their outer ends each on laterally aligned rods 26 which rods have restricted threaded upper ends 37 which extend through longitudinally elongated openings 38 of the bars 36 and which are secured thereto by nuts 39 so that said bars 36 rest on the upper ends of the enlarged portions of the rods 26. An elongated, substantially flat needle supporting tank 40 is supported by the bars 36 and suspended therebeneath and above the table top 14, said bars 36 being connected to the top wall of the tank 40 by suitable fastenings 41, as seen in Figures 7 and 8.

The tank 40 is provided with a substantially flat bottom 42 having a plurality of longitudinal rows of threaded openings 43 formed in said bottom 42 and the openings of which rows are disposed in staggered relationship, as seen in Figure 5. A nut 44 is mounted in each opening 43 and extends downwardly from the tank bottom 42, each nut 44 having a restricted threaded extension 45 for engaging the threaded opening 43 and a downwardly opening internally threaded socket 46 for receiving the restricted threaded extension 47 of a nut 48. Each nut 44 has a bore 49 extending longitudinally therethrough and which opens outwardly of its restricted extension 45 and into the socket 46 and in which the open end of a tubular needle 50 is suitably secured as by press fit engagement. The nut 48 is provided with a bore 51 which extends longitudinally therethrough and through which the needle 50 passes. A lead washer 52, having a central opening for accommodating the needle 50 is preferably disposed in the socket 46 and held in the bed threof by the nut 48. It will be readily apparent that a pair of the nuts 44 and 48 and a needle 50, plus the additional parts associated therewith and hereinafter to be described is provided for each tank opening 43.

Each needle 50 is provided with a pointed, closed lower end 53 and adjacent said lower end 53 is provided with longitudinally and circumferentially spaced discharge ports 54 which open outwardly thereof and which communicate with the bore 55 of the needle. The ports 54 are arranged in diametrically aligned pairs and with the adjacent pairs of ports disposed at right angles to one another, as clearly illustrated in Figure 9. A sleeve 56 is slidably mounted on each needle 50 and is provided with an outturned annular flange 57 at its lower end. An expansion coiled spring 58 is loosely disposed around each needle 50 and its sleeve 56 and is secured as by welding at its upper end as seen at 59 to the nut 48 and is similarly secured at its lower end by a weld 60 to the sleeve flange 57. The sleeve 56 has a close fitting sliding engagement with the needle 50 and is normally supported in a projected position by the spring 58 over the needle discharge ports 54 as illustrated in Figure 7 for normally closing said discharge ports.

A shaft 61 extends between and is supported by the legs 15 at one end of the table 13 and a relatively long lever 62 is journaled at one end thereof on the intermediate portion of said shaft 61 and has diagonal braces 63 adjacent said end and which are likewise journaled on the shaft 61 inwardly of but adjacent the legs 15 on which the shaft 61 is mounted. If desired, the lever 62 may be secured fast to the shaft 61 and said shaft journaled in the legs 15. Nuts 64 engage the threaded ends of the shaft 61 for detachably retaining it in engagement with the two aforementioned legs 15. The lever 62 extends longitudinally of the table 13 and beneath the spider 29 and is provided with diverging arms 65 at its opposite end between which is journaled a foot pedal 66 which projects outwardly beyond the two legs 15 at the opposite end of the table 13. The lever 62 is provided, intermediate of its ends, with an upstanding apertured lug 67 which is disposed beneath a corresponding lug 68 which depends from the center of the spider 29 and a link 69 is pivotally connected at 70 adjacent its ends to the lugs 67 and 68. A contractile spring 71a is anchored at its upper end to an eye 72a which depends from the underside of the table top 14 and at its lower end to an eye 73a which projects upwardly from the lever 62 for cooperating with the spring 30 for supporting said lever 62 normally in an upwardly inclined position from its pivotally mounted end, as seen in Figure 1.

A U-shaped conduit 71 is mounted on each end of the tank 40 and has corresponding ends connected to said tank and communicating with the interior thereof and is provided intermediate of its ends with a T coupling connection 72 which is connected to an outlet end of a branch 73 of a conduit 74. The conduit 74 which leads from a suitable source of supply of a pickling or curing solution, not shown, is provided with a normally closed valve, designated generally 75. The valve 75 is normally held in a closed position by a spring 76 and is adapted to be displaced to an open position by the downward swinging movement of a lever 77 to the free end of which is connected a depending member 78 having a handle 79 at its lower end, so that by pulling downwardly on the handle 79 the valve 75 will be opened to allow the pickle or curing solution to flow through the conduit 74 and through each of its branches 73 into the ends of the tank 40 through the U-shaped conduits 71, said pickle or curing solution, not shown, preferably being supplied under pressure in any conventional manner.

From the foregoing it will be readily apparent that a piece of meat such as a bacon 80 may be laid on the table top 14 between the side wall portions 18 and with the needles 50 disposed in elevated, retracted positions, as seen in Figure 7. The operator of the machine 12 from a position adjacent the end of the table from which the free end of the lever 62 projects, then places his foot on the pedal 66 for swinging the lever 62 downwardly to its dotted line position of Figure 1. This downward swinging movement of the lever 62 will cause the spider 29 to be drawn downwardly against the action of the spring 30 and will likewise cause the four rods 26 to slide downwardly through the sleeves 25 and 27 until the ends of the bars 36 abut the upper ends of the sleeves 27, as illustrated in Figure 8. As the rods 26 are thus moved downwardly, the bars 36 secured thereto are displaced downwardly therewith thereby displacing the tank 40 and needles 50 downwardly in a like manner. The piercing ends 53 initially pierce the upper surface of the meat 80 after which the flanges 57 of the sleeves 56 come into contact with the upper surface of the meat 80 so that further downward movement of the needles 50 into the meat 80 will cause said needles to slide downwardly relatively to the sleeves 56 which are thus supported on the upper surface of the meat 80. When the needles 50 have reached their fully projected positions, as seen in Figures 8 and 9, all of the discharge ports 54 thereof will be disposed below the sleeves 56 and within the meat 80. With the parts thus disposed and while maintaining the lever 62 in its depressed position, the operator can pull downwardly on the handle 79 for opening the valve 75 so that the pickling or curing solution may flow under pressure into the tank 40 and through the bores 55 of the needles 50 to be discharged under pressure through the needle ports 54 for thereby injecting the pickle solution into the meat. After a proper period, usually of approximately four seconds, the handle 79 is released allowing the spring 76 to automatically return the valve 75 to a closed position and the operator then removes his foot from the pedal 66 thereby permitting the springs 30 and 71a to retract for returning the lever 62 and the spider 29 to their positions of Figure 1 and which will cause the rods 26 to be displaced upwardly carrying with them the bars 36, tank 40 and needles 50. As the tank 40 moves upwardly the needles 50 are withdrawn from the meat 80 but during the initial upward movement of the needles 50, the sleeves 56 are maintained in engagement with the meat 80 by expansion of the springs 58 so that as the needles 50 move upwardly the discharge ports thereof are closed by the sleeves 56 as said ports move out of engagement with the meat 80 and when the flanges 57 are disposed adjacent the piercing ends 53 of the needles, the sleeves 56 are then supported by the expanded springs 58 and thereafter move upwardly with the needles 50 to the retracted positions of the parts as seen in Figures 1, 3 and 7. The meat 80, thus injected with the pickle solution is then ready to be placed in the smoke house.

Any of the pickle solution which may escape from the needles or meat onto the table top 14 drains into the troughs 19 and passes therefrom through the conduits 21 into the return conduit 23 which may lead to any suitable sump or well, not shown. The side wall portions 17 of the table 13 function as splash guards to prevent any of the pickle solution from splashing over the sides of the table 13.

Various modifications and changes are contemplated and may obviously be resorted to, without departing from the spirit or scope of the invention as hereinafter defined by the appended claims.

I claim as my invention:

1. A machine for injecting a pickle solution into meat comprising a table having a top surface on which a piece of meat to be injected with a pickle solution is adapted to be supported, a spider disposed beneath said table top, spring means yieldably supporting said spider from the table top, vertical guide members at the sides of said table and supported thereby, rods extending reciprocally through said guide members and connected at their lower ends to said spider and supported thereby, bars connected to the upper ends of said rods and supported thereby above the table top, a tank fastened to said bars and supported therebeneath, a conduit connected to the ends of said tank for supplying a pickle solution to the tank, a plurality of injection needles connected to and depending from said tank toward the table top and each provided with a longitudinally extending bore having an end opening into the tank, said needles each being provided adjacent its opposite, lower end with a plurality of radially opening discharge ports communicating with the needle bore, and means connected to and disposed beneath said spider and pivotally mounted on the table and adapted to be manually actuated for displacing the spider downwardly against the action of its supporting spring means for moving said rods and the tank downwardly for displacing the needles toward the table top to cause the needles to penetrate the meat supported by the table top whereby the pickle solution can be injected into the meat through said discharge ports of the needles.

2. A machine as in claim 1, said conduit for the pickle solution being provided with a normally closed valve adapted to be manually opened for supplying the pickle solution to the tank and needles.

3. A machine as in claim 1, and means resiliently supported on each of said needles for normally closing the discharge ports thereof, said means being adapted to be displaced out of engagement with said discharge ports, when the needles are moved downwardly into engagement with the meat, by engagement of said means with the upper surface of the meat.

4. A machine as in claim 1, each of said needles being provided with a closed, tapered lower end forming a piercing point.

5. A machine as in claim 1, each of said needles being provided with a closed, tapered lower end forming a piercing point, a sleeve slidably mounted on each needle, a contractile coiled spring connected to each sleeve and adapted to be connected to a supporting means of the needle for normally supporting the sleeve over the discharge ports of the needle for closing said discharge ports, each sleeve having a flanged lower end adapted to engage the upper surface of the meat when the needle is advanced to penetrate the meat for displacing the sleeve upwardly on the needle for exposing the discharge ports, and said sleeve supporting spring functioning to return the sleeve to a position for closing the needle discharge ports when the needle is retracted out of the meat.

6. A machine as in claim 1, said needles being arranged on the tank in a plurality of rows extending longitudinally of the tank and table top, the adjacent rows of needles being staggeredly arranged.

7. A machine as in claim 1, each of said rods having a sleeve slidably mounted thereon above and beneath its guide, the sleeves disposed above said guides forming stops for engaging said bars for limiting the downward movement of the tank and needles toward the table top, and the sleeves disposed beneath said guides forming stops for engaging the lower ends of the guides for limiting the upward movement of the tank under the biasing action of said spring.

8. A machine as in claim 1, said manually actuated means comprising a lever pivotally supported at one end thereof on certain of the supporting legs of the table and extending longitudinally of said table, and a foot pedal pivotally mounted in the opposite end of said lever and disposed beyond an end of the table and beneath and adjacent said manually controlled valve whereby the foot pedal may be conveniently engaged by the foot of the operator while standing at one end of the table and in a position for manually actuating the valve.

9. A machine as in claim 1, said table being provided with upstanding side walls forming splash boards and having open ends, troughs mounted at the open ends of the table top for receiving pickle solution draining therefrom, and conduits leading from said troughs for draining off the pickle solution by gravity therefrom.

WILLIAM M. ZWOSTA.

REFERENCES CITED

The following references are of record in the file of this patent:

UNITED STATES PATENTS

| Number | Name | Date |
|---|---|---|
| 474,965 | McCormick | May 17, 1892 |
| 554,999 | Fowler | Feb. 18, 1896 |
| 682,572 | Schlarb | Sept. 10, 1901 |
| 1,166,607 | LaPorte | Jan. 4, 1916 |
| 1,271,490 | Servatius | July 2, 1918 |
| 1,315,242 | Servatius | Sept. 9, 1919 |
| 2,466,772 | Kenyon | Apr. 12, 1949 |

FOREIGN PATENTS

| Number | Country | Date |
|---|---|---|
| 113,531 | Germany | Oct. 14, 1899 |
| 502,486 | Germany | Feb. 12, 1928 |